(12) United States Patent
Karnik

(10) Patent No.: US 10,462,838 B2
(45) Date of Patent: Oct. 29, 2019

(54) METHODS AND APPARATUS FOR MANAGING COMMUNICATION DEVICES

(71) Applicant: MasterCard International Incorporated, Purchase, NY (US)

(72) Inventor: Ajit Madhukar Karnik, Pune (IN)

(73) Assignee: Mastercard International Incorported, Purchase, NY (US)

( * ) Notice: Subject to any disclaimer, the term of this patent is extended or adjusted under 35 U.S.C. 154(b) by 226 days.

(21) Appl. No.: 15/239,208

(22) Filed: Aug. 17, 2016

(65) Prior Publication Data
US 2017/0052658 A1 Feb. 23, 2017

(30) Foreign Application Priority Data
Aug. 18, 2015 (SG) ............................. 10201506507Q

(51) Int. Cl.
| | |
|---|---|
| *H04M 1/725* | (2006.01) |
| *H04L 12/28* | (2006.01) |
| *H04L 29/08* | (2006.01) |
| *H04W 76/23* | (2018.01) |
| *H04W 4/14* | (2009.01) |
| *H04W 84/20* | (2009.01) |

(52) U.S. Cl.
CPC ........... *H04W 76/23* (2018.02); *H04M 1/725* (2013.01); *H04W 4/14* (2013.01); *H04W 84/20* (2013.01)

(58) Field of Classification Search
None
See application file for complete search history.

(56) References Cited

U.S. PATENT DOCUMENTS

| | | | |
|---|---|---|---|
| 5,787,356 A | 7/1998 | Tanaka et al. | |
| 6,359,892 B1* | 3/2002 | Szlam ............... | H04M 3/42229 370/401 |
| 7,647,051 B2 | 1/2010 | Bennett et al. | |
| 9,332,587 B2 | 5/2016 | Salahshoor | |
| 2002/0035607 A1* | 3/2002 | Checkoway ......... | G06Q 10/107 709/206 |
| 2003/0120784 A1* | 6/2003 | Johnson ................ | H04L 63/029 709/228 |
| 2010/0162118 A1* | 6/2010 | Kim .................... | H04L 12/2809 715/716 |
| 2010/0263015 A1* | 10/2010 | Pandey ............ | H04N 21/42203 725/153 |
| 2014/0358250 A1 | 12/2014 | Crohas et al. | |
| 2015/0139044 A1 | 5/2015 | Maski | |

* cited by examiner

*Primary Examiner* — Nhat Huy T Nguyen
(74) *Attorney, Agent, or Firm* — Armstrong Teasdale LLP

(57) ABSTRACT

A computer implemented method of controlling a slave communication device from a master communication device is provided. The method includes displaying, on a display of the master communication device, an indication of a plurality of slave devices paired with the master communication device, receiving, on the master communication device, a user selection of a slave communication device from the plurality of slave communication devices, displaying, on the master communication device, a representation of at least part of a user interface of the selected slave communication device, receiving a user interaction with the virtual phone display region, transmitting control signals on the wireless network connection to cause the selected slave communication device establish a voice call, and transmitting and receiving bi-directional audio signals to and from the slave communication device over the wireless network connection to facilitate the voice call.

38 Claims, 6 Drawing Sheets

METHODS AND APPARATUS FOR MANAGING COMMUNICATION DEVICES

CROSS REFERENCE TO RELATED APPLICATIONS

This application claims the benefit of Singapore Patent Application No. 10201506507Q filed Aug. 18, 2015, which is hereby incorporated by reference in its entirety.

BACKGROUND

The present disclosure relates to a methods and systems for managing communication devices such as mobile telephones. In particular it provides methods and systems for a user to manage multiple communication devices.

Mobile telephones and other mobile communication devices, such as tablet computers, have become ubiquitous. Many users carry and use multiple mobile communication devices. For example, a person may carry a company phone which they use for work related calls and communications, and a personal phone which they use for communication with family and friends. Further, it is common for people who regularly visit foreign countries to carry an additional phone with a subscriber identity module (SIM) for a network operator local to the country that they are visiting.

Interacting with multiple communication devices can be inconvenient for a user. For example, when a telephone call is received on one device, a user must locate that device to answer the call.

BRIEF DESCRIPTION

In general terms, the present disclosure proposes a method and system for managing communication devices. In particular, in the proposed system, a communication device acts as a master communication device through which a user can manage a plurality of slave communication devices. When, for example, a call is received on one of the slave devices, the user receives an alert on the master communication device and can answer the call on the master communication device.

According to a first aspect of the present disclosure, there is provided a computer implemented method of controlling a slave communication device from a master communication device. The method includes displaying, on a display of the master communication device, an indication of a plurality of slave devices paired with the master communication device on a wireless network, receiving, on the master communication device, a user selection of a slave communication device from the plurality of slave communication devices, and displaying, on a virtual phone display region of the display of the master communication device, a representation of at least part of a user interface of the selected slave communication device. The at least part of the user interface of the selected slave device includes user controls for a voice call function on the slave communication device. The method also includes receiving a user interaction with the virtual phone display region of the display of the master communication device, in response to the user interaction, transmitting control signals on the wireless network connection to cause the selected slave communication device establish a voice call, and transmitting and receiving bi-directional audio signals to and from the slave communication device over the wireless network connection to facilitate the voice call.

In an embodiment the method further includes receiving an alert from a slave communication device and providing a user alert indicating the corresponding slave communication device. The alert may be an alert of an incoming call. The alert may be a visual alert displayed on the virtual phone display region. Additionally, or alternatively, the alert may be an acoustic or vibration alert. The sound or vibration pattern of the alert may indicate the slave communication device corresponding to the alert.

In an embodiment the user interaction with the virtual phone display region of the display of the master communication device is an indication to answer an incoming call.

In an embodiment the user interaction with the virtual phone display region of the display of the master communication device is an indication to make an outgoing call.

According to a second aspect of the present disclosure, a communication device is disclosed. The communication device includes a processor, a data storage device and a wireless network interface. The data storage device has computer program modules comprising non-transitory instructions that cause the processor to: to display, on a display of the communication device, an indication of a plurality of slave devices paired with the communication device, receive, on the communication device, a user selection of a slave communication device from the plurality of slave communication devices, and display, on a virtual phone display region of the display of the communication device, a representation of at least part of a user interface of the selected slave communication device. The at least part of the user interface of the selected slave device comprising user controls for a voice call function on the slave communication device. The non-transitory instructions also cause the processor to receive a user interaction with the virtual phone display region of the display of the communication device, in response to the user interaction, transmit control signals using the wireless network interface to cause the selected slave communication device establish a voice call, and transmit and receive bi-directional audio signals to and from the slave communication device using the wireless network interface to facilitate the voice call.

In an embodiment the alert is an alert of an incoming message on the slave communication device.

In an embodiment, the computer program modules further include non-transitory instructions that cause the processor to receive a message view user interaction with the virtual phone display region of the display of the master communication device, the message view interaction comprising an indication to view an incoming message, transmit control signals using the wireless network interface to cause the selected slave communication device to open an incoming message and send data indicative of the content to the incoming message to the master communication device in response to the message view user interaction, and to display the incoming message on the virtual phone display region of the master communication device.

The incoming message may be an SMS or MMS message, an instant messaging message from an instant messaging service such as Skype or WhatsApp or an email message.

In an embodiment, the computer program modules further include non-transitory instructions that cause the processor to receive a message send user interaction with the virtual phone display region of the display of the master communication device, the message send interaction comprising an indication to send an outgoing message, and in response to the message send user interaction to transmit control signals using the wireless network interface to cause the selected slave communication device to send the outgoing message.

The outgoing message incoming message may be at least one of an SMS message, an MMS message, an instant messaging message, and an email message.

In an embodiment, the computer program modules further include non-transitory instructions that cause the processor to receive a data access user interaction with the virtual phone display region of the display of the master communication device, the data access user interaction comprising an indication to access data stored on the selected slave device, in response to the data access user interaction to transmit control signals using the wireless network interface to cause the selected slave communication device to access data stored on the slave communication device and to send an indication of the data stored on the slave communication device to the master communication device, and to display an indication of the data stored on the slave communication device on the virtual phone display region of the master communication device.

In an embodiment, the computer program modules further includes, non-transitory instructions that cause the processor to receive a data modification user interaction with the virtual phone display region of the display of the master communication device, the data modification user interaction comprising an indication to modify the data stored on the selected slave device, and in response to the data modification user interaction to transmit control signals using the wireless network interface to cause the selected slave communication device to modify the data stored on the slave device.

In an embodiment, the data stored on the selected slave communication device comprises calendar information and/or contact information.

According to a third aspect of the present disclosure, there is provided a method in a slave wireless device. The method includes monitoring a communication channel between the slave wireless communication device and a master communication device using the first wireless network interface, receiving control signals over the communication channel to establish a voice call, establishing a voice call over using the second wireless network interface, and transmitting and receiving bi-directional audio signals to and from the master communication device using the first wireless network interface to provide the voice call to the master communication device.

In an embodiment, the method further includes receiving an indication of an incoming voice call on the second wireless network, and providing an alert of the incoming voice call to the master communication device over the first wireless network, wherein the control signals to establish a voice call are control signals to answer the incoming voice call.

In an embodiment, the control signals to establish a voice call are control signals to make an outgoing voice call.

In an embodiment, the second wireless network is a cellular telephone network.

According to a fourth aspect of the present disclosure, there is provided a communication device including, a processor, a data storage device, a first wireless network interface, and a second wireless network interface. The data storage device has computer program modules comprising non-transitory instructions operative by the processor to monitor a communication channel between the slave wireless communication device and a master communication device over a first wireless network, receive control signals over the communication channel to establish a voice call, establish a voice call over a second wireless network, and transmit and receive bi-directional audio signals to and from the master communication device over the first wireless network to provide the voice call to the master communication device.

In an embodiment, the computer program modules further include non-transitory instructions that cause the processor to receive an indication of an incoming message on the second wireless network interface, provide an alert of the incoming message to the master communication device using the first wireless network interface, receive control signals from the master communication device using the first wireless network interface, and in response to the control signals to open the incoming message and send data indicative of the content incoming message to the master communication device using the first wireless network interface.

The incoming message may be at least one of an SMS message, an MMS message, an instant messaging message, and an email message.

In an embodiment, the computer program modules further include non-transitory instructions that cause the processor to receive control signals indicating an outgoing message from the master communication device using the first wireless network interface, and in response to the control signals to send an outgoing message using the second wireless network interface.

The outgoing message may be at least one of an SMS message, an MMS message, an instant messaging message, and an email message.

In an embodiment, the computer program modules further include non-transitory instructions that cause the processor to receive data access control signals from the master communication device using the first wireless network interface, the data access control signals indicating a data item of the user data, access the data item in response to the data access control signals, and transmit an indication of the data item to the master communication device using the first wireless network interface.

In an embodiment, the computer program modules further comprise non-transitory instructions that cause the processor to: receive data modification control signals from the master communication device using the first wireless network interface, the data modification control signals indicating a data item and modification to the data item, and to modify the data item indicated by the data modification control signals in accordance with the data modification.

In an embodiment, the user data includes at least one of calendar information and contact information.

According to a yet further embodiment, there is provided a non-transitory computer-readable medium. The computer-readable medium has stored thereon program instructions for causing at least one processor to perform operations of a method disclosed above.

The term "wireless network" refers to any type of network connection that allows wireless data transfer. It may be a Wireless Local Area Network (WLAN or Wi-Fi), a Bluetooth connection, a Near Field Communication (NFC) connection, or a network comprising a combination of different wireless network types.

The term "communication device" refers a piece of equipment or hardware which is capable of transmitting and receiving data electronically. It may be a computer device such as a mobile phone (e.g. smartphones or conventional/feature phones), a tablet, a desktop computer, a laptop computer or a smart watch etc.

BRIEF DESCRIPTION OF THE DRAWINGS

Embodiments of the disclosure will now be described for the sake of non-limiting example only, with reference to the following drawings in which.

DETAILED DESCRIPTION

Figure 1:
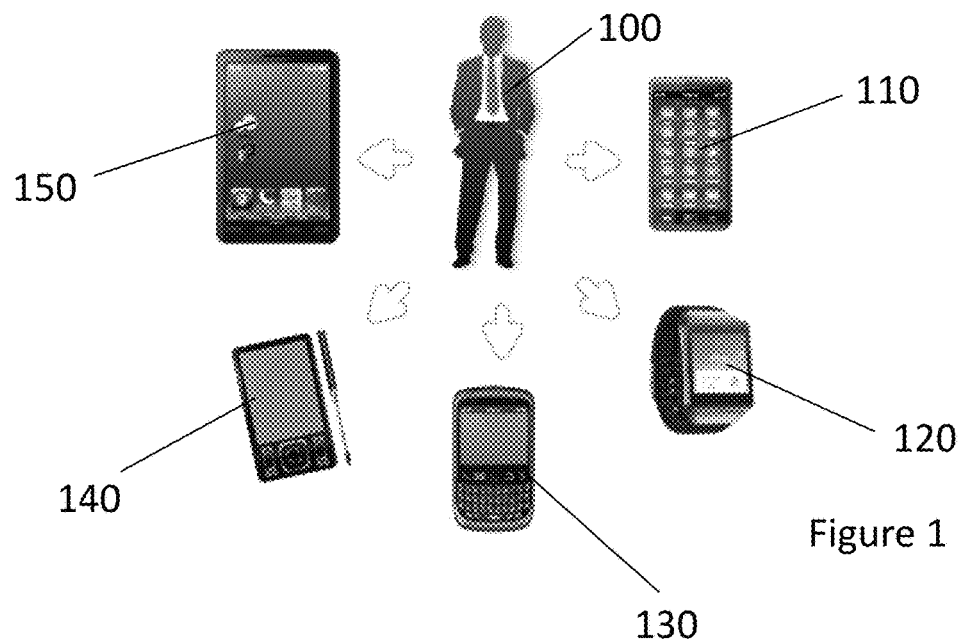
FIG. 1 illustrates a user having a plurality of mobile communication devices.

FIG. 1 shows a user in possession of multiple mobile communication devices. In the example shown in FIG. 1, the user 100 has five mobile communications devices. The communications devices are a personal phone 110, a smart watch device 120, a business or work phone 130, a personal digital assistant 140 and a tablet device 150. Each of the mobile communication devices is able to send and receive communications over one or more wireless networks. These communications may include telephone calls, video calls, text messages, multimedia messages, emails, and other communications. The devices may also store information such as calendar details, alarms and alerts, details of contacts, and other data.

In order to intact with one of the devices, for example to answer a phone call, the user must physically handle a specific one of the devices and interact with the user interface of that device.

Figure 2:
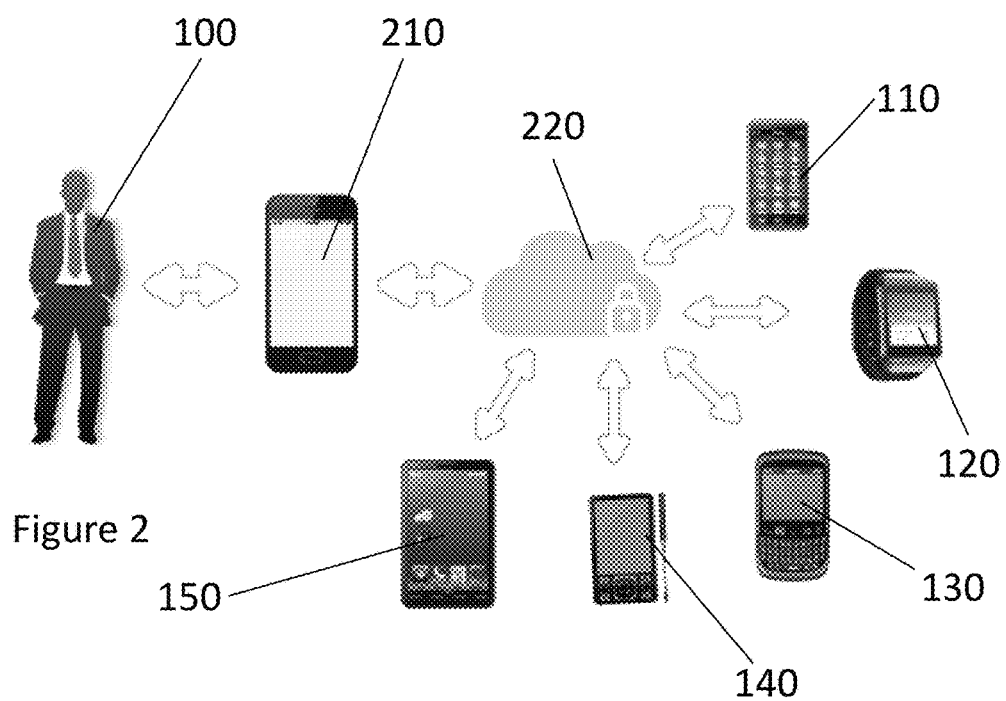
FIG. 2 illustrates a system according to an embodiment of the of the disclosure.

FIG. 2 shows a system according to an embodiment of the present invention. The system includes a master communication device 210 which allows the user 100 to interact with each of the five mobile communication devices over a network 220. In the system shown in FIG. 2, the user can interact with each of the five communication devices through the master communication device 210. This means that if a telephone call is received on, for example, the personal phone 110, the call can be answered by the user on the master communication device 210 without the need for the user to physically interact with the personal phone 110. In the following description the personal phone 110, the smart watch device 120, the business or work phone 130, the personal digital assistant 140 and the tablet device 150 are referred to as slave communication devices. The nature and number of slave communications devices shown in FIG. 2 is intended to be an example only and the embodiments described below are intended to apply to systems with variable numbers of slave devices.

Figure 3:
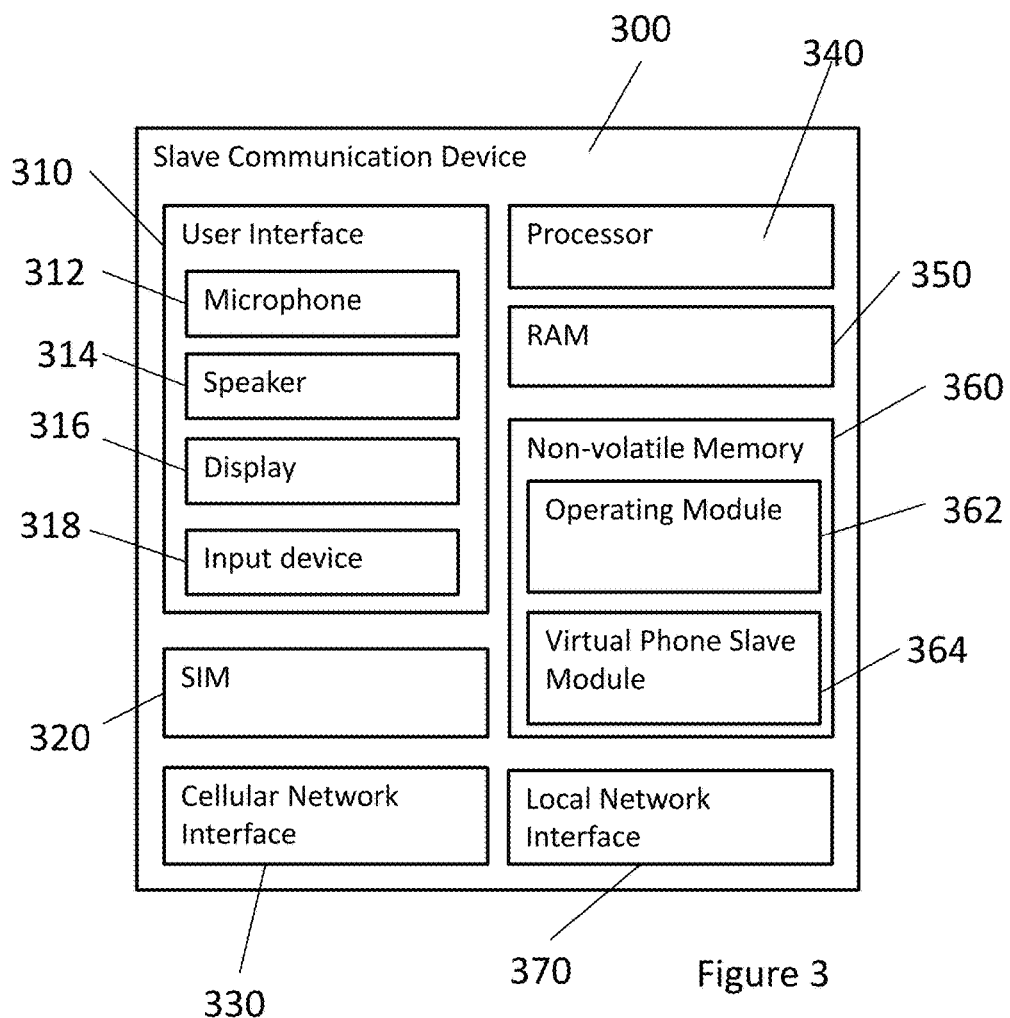
FIG. 3 is a block diagram showing a technical architecture of a slave communication device according to an embodiment of the present disclosure.
Figure 4:
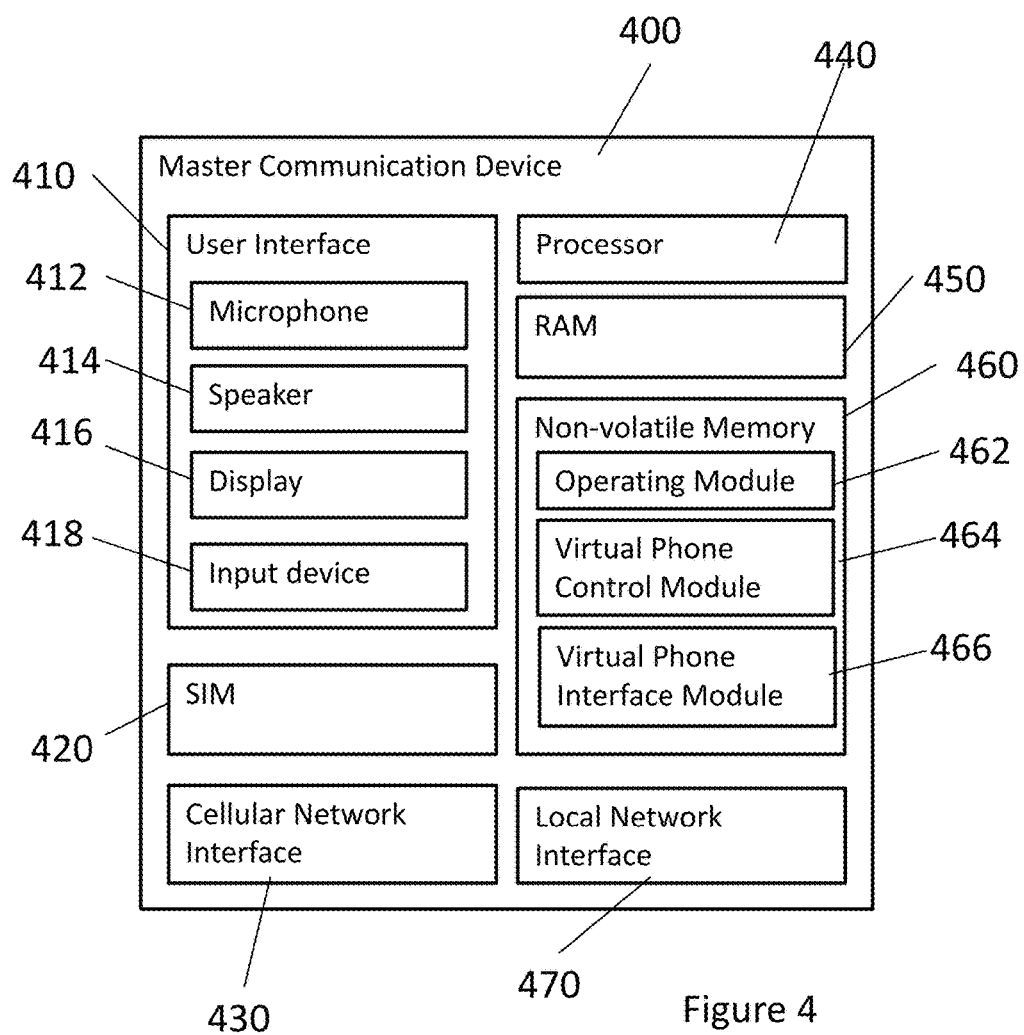
FIG. 4 is a block diagram showing a technical architecture of a master communication device according to an embodiment of the present disclosure.

FIGS. 3 and 4 are block diagrams showing a technical architecture of the slave communication device and the master communication device respectively. The slave communication device and master communication device may be smartphones, or other communication devices that allow a user to make and receive telephone calls over a cellular network.

The slave communication device 300 includes a user interface 310. The user interface 310 includes a microphone 312, a speaker 314, a display 316 and an input device 318. The input device 318 may be implemented as a touch screen, a keypad, a keyboard, or other user input device. The slave communication device further includes a subscriber identity module (SIM) 320, and a cellular network interface 330. The slave communication device 300 further includes a processor 340 (which may be referred to as a central processor unit or CPU) that is in communication with memory devices including random access memory (RAM) 350 and non-volatile memory 360. The processor 340 may be implemented as one or more CPU chips. The slave communication device 300 further includes a local network interface 370.

The non-volatile memory 360 may be implemented as a flash solid state memory and is used for non-volatile storage of data and as an over-flow data storage device if RAM 350 is not large enough to hold all working data. The non-volatile memory 360 is used to store programs which are loaded into RAM 350 when such programs are selected for execution. In this embodiment, non-volatile memory 360 has an operating module 362 and a virtual phone slave module 364. The non-volatile memory 360, and/or the RAM 350, may be referred to in some contexts as computer readable storage media and/or non-transitory computer readable media.

The SIM 320 stores information that allows the slave communication device 300 to be uniquely identified by a network operator. The cellular network interface 330 provides for radiofrequency communication between the slave communication device 300 and a base station according to a cellular communication standard such as code division multiple access (CDMA), global system for mobile communications (GSM), long-term evolution (LTE).

The local network interface 370 is a wireless network interface that allows the slave communication device 300 to communicate with a master communication device. Examples of the protocols which may be used by the local network interface include, but are not limited to, wireless local area network (WLAN or Wi-Fi), near field communications (NFC), radio frequency identity (RFID), Bluetooth, Bluetooth Low Energy (BLE), and other wireless communication standards and any variant of radio or other two-way digital or analogue wireless communication modulation, standards and schemes.

The cellular network interface 330 or the local network interface may enable the processor 340 to communicate with the Internet or one or more intranets. With such a network connection, it is contemplated that the processor 340 might receive information from the network, or might output information to the network in the course of performing the above-described method operations. Such information, which is often represented as a sequence of instructions to be executed using processor 340, may be received from and outputted to the network, for example, in the form of a computer data signal embodied in a carrier wave.

The processor 340 executes instructions, codes, computer programs, scripts which it accesses from the non-volatile memory 360, RAM 350, or the network interfaces. While only one processor 340 is shown, multiple processors may be present. Thus, while instructions may be discussed as executed by a processor, the instructions may be executed simultaneously, serially, or otherwise executed by one or multiple processors.

It is understood that by programming and/or loading executable instructions onto the slave communications device 300, (e.g, onto RAM 350) transforming the slave communications device technical architecture 300 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

The operating module 362 stored in the non-volatile memory 364 contains instructions for carrying out the operating functions of the slave communication device 300 when operating as a stand-alone communication device. These operating functions may include, but is not limited to, making and receiving telephone calls, sending and receiving messages such as Short Message Service (SMS) messages, Multimedia Messaging Service (MMS) and other types of message, access to the intern& and email accounts, access and modification of stored contacts, access to and modification of calendar and appointment details, access to an instant messaging service such as Skype® (Skype is a registered trademark of Microsoft Corporation, Redmond, Wash.) or WhatsApp® (WhatsApp is a registered trademark of WhatsApp Inc., Mountain View, Calif.), and other functions.

The virtual phone slave module 364 stored in the non-volatile memory 364 contains instructions for carrying out operations under the control of a master communication device. The operation of this module is explained in more detail below.

As shown in FIG. 4, the master communication device 400 includes a user interface 410, a SIM 420, a cellular network interface 430, a processor 440, a RAM 450, a non-volatile memory 460, and a local network interface 470. The configuration and operation of the user interface 410, the SIM 420, the cellular network interface 430, the processor 440; the RAM 450, and the local network interface 470 are as described above for the corresponding element of the slave communication device 300.

The non-volatile memory 460 stores an operating module 462, a virtual phone control module 464 and a virtual phone interface module 466. As described above in relation to the slave communication device, the operating module 462 contains instructions for carrying out the operating functions of the master communication device 400 when operating as a stand-alone communication device.

The virtual phone control module 464 contains instructions for controlling a slave communication device to carry out operations under the control of the master communication device 400. The virtual phone interface module 466 contains instructions for allowing a user of the master communication device 400 to interact with a slave communications device using the user interface 410 of the master communication device 400. The operation of these modules is explained in more detail below.

The operations of methods carried out by the master communication device and the slave communication device will now be described with reference to FIGS. 5 to 9. It should be noted that enumeration of operations is for purposes of clarity and that the operations need not be performed in the order implied by the enumeration.

Figure 5:
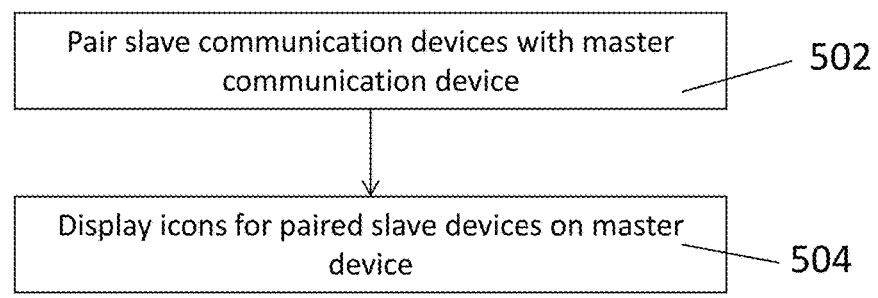
FIG. 5 is a flow diagram of operations according to an embodiment of the present disclosure.

FIG. 5 is a flow diagram showing a method of establishing a system for managing slave communication devices by a master communication device. At step 502, the slave communication devices are paired with the master communication device. In an embodiment, the pairing is implemented using two parameters, the device name and a PIN which is only known to the user of the two devices. This pairing may be carried out according to the Bluetooth standard. The device names may be kept hidden, that is, not broadcast so that other parties cannot see the device names. Security of device pairing can be enhanced by allowing pairing of devices using parameters that are known only to the device owner, or that can be discovered from the set-up options for the device. Examples of such parameters are device specific information such as MAC ID, Device ID, Bluetooth ID and other similar unique values. This ensures that devices cannot be paired by snooping the device names by monitoring the network.

The pairing procedure may be implemented according to a standard such as Bluetooth by BT-SIG or WiFi by WiFi-Alliance. The paring procedure may use near field communication (NFC) to exchange connection parameters and keys, for example according to the 'Bluetooth Secure Simple Pairing Using NFC' standard by NFC Forum. The paring may involve one device displaying a QR code and the other devices using a camera to read the QR code and determine connection parameters and keys from the read QR code.

At step 504, the master communication device displays indications, for example icons for the paired slave devices.

Figure 6:
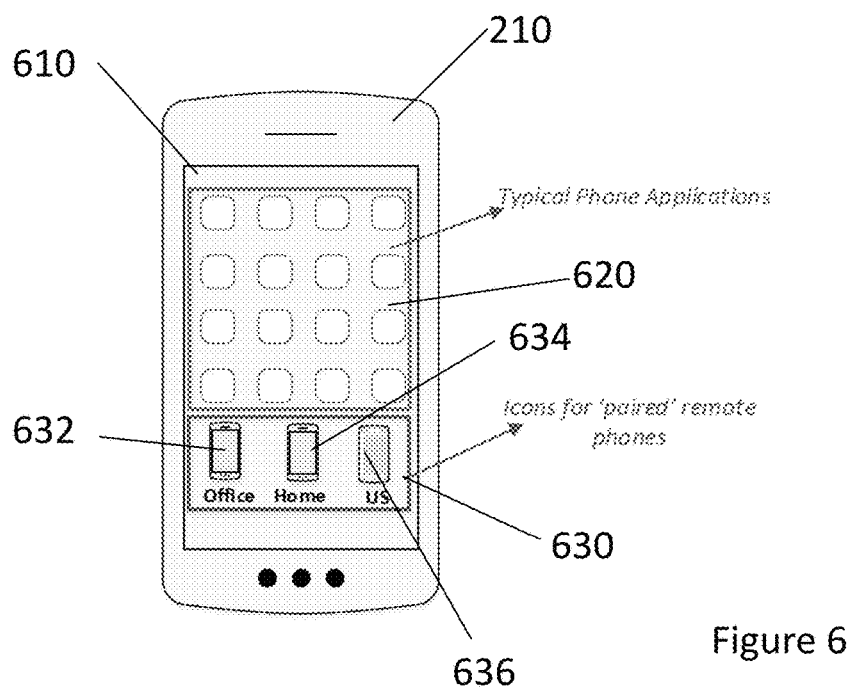
FIG. 6 is an illustration of a display screen of a master communication device when implementing a method according to an embodiment of the present disclosure.

FIG. 6 shows an example of the display screen of a master communication device according to an embodiment of the present invention. As shown in FIG. 6, the display 610 of the master communication device 210 has a section 620 that displays icons for applications running on the master communication device 210 and a section 630 that displays icons for the connected slave communication devices. As shown in FIG. 6, in this example, the section 630 that displays icons for the connected slave devices shows three icons. There is an icon 632 for the user's office phone, an icon 634 for the user's home or personal phone, and an icon 636 for a 'US' phone, that is a phone that has a SIM that is used when travelling in the USA.

Figure 7:
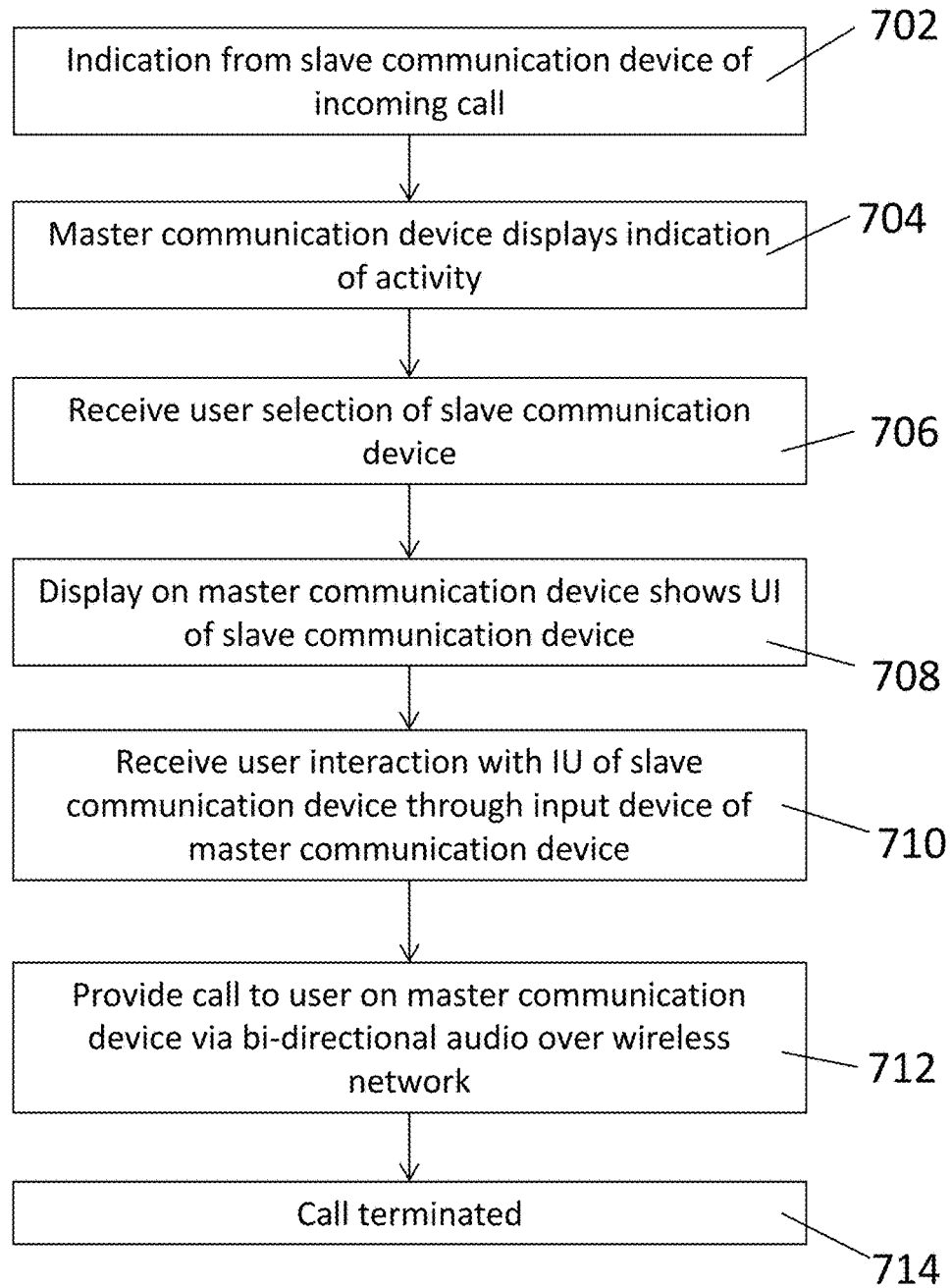
FIG. 7 is a flow diagram of operations according to an embodiment of the present disclosure.

FIG. 7 is a flow diagram showing a method of managing a slave communication device from a master communication device according to an embodiment of the present invention. At step 702, the master communication device receives an indication from one of the paired the slave devices of an incoming call. At step 704, the master communication device displays an indication of the activity on the slave device which received the call.

Figure 8:
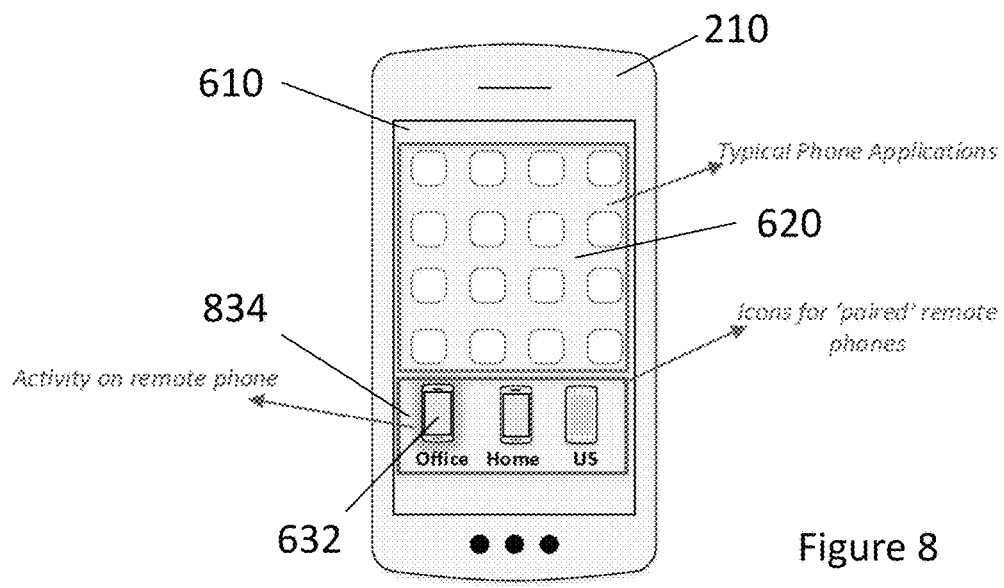
FIG. 8 is an illustration of a display screen of a master communication device when implementing a method according to an embodiment of the present disclosure.

FIG. 8 shows an example of the display screen of a master communication device when a call is received on a slave device in an embodiment of the present invention. The display 610 of the master communication device 210 has a section 620 that displays icons for applications running on the master communication device 210 and a section 630 that displays icons for the connected slave communication devices. For example, when a call is received on the 'office' phone, the icon 632 for the 'office' phone displayed on the master communication device 210 includes an indication 834 of the incoming phone call. In addition to the indication 834 of the incoming phone call, the master communication device 210 may also give an audio indication of the call and/or may vibrate.

Returning to FIG. 7, at step 706, the user selects the slave device. In the example described in relation to FIG. 8, this is the 'office' phone. This selection may be made by the user selecting the icon 632 for the 'office' phone.

At step 708, the display 610 of the master communication device 210 shows the user interface of the slave device that the user selected in step 706. This is illustrated in FIG. 9.

Figure 9:
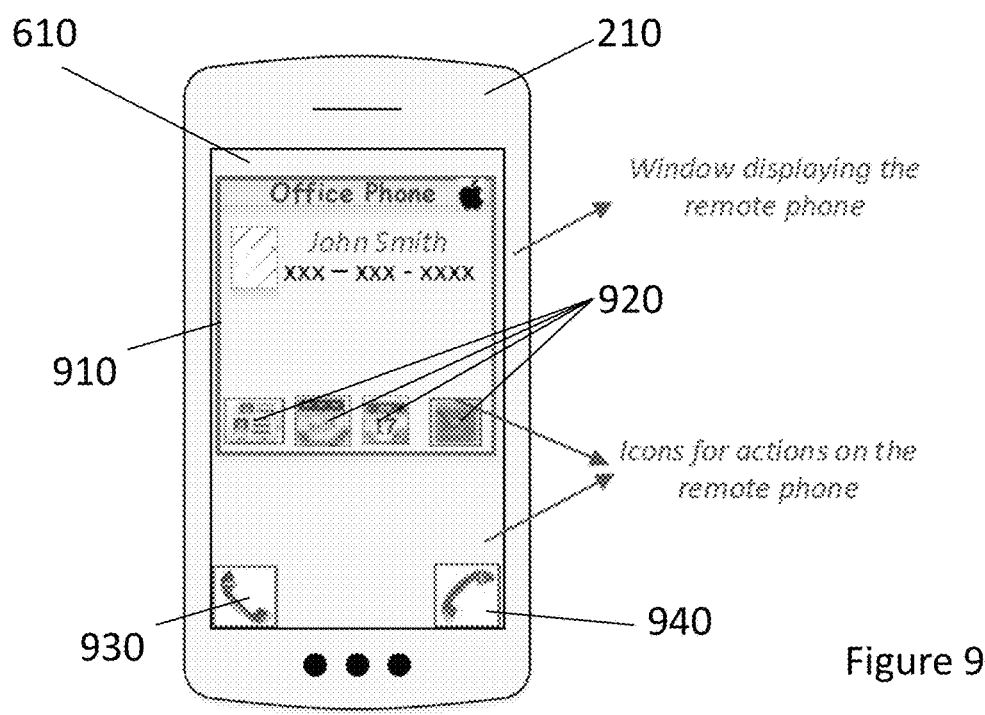
FIG. 9 is an illustration of a display screen of a master communication device when implementing a method according to an embodiment of the present disclosure.

FIG. 9 shows the display of a master communication device when displaying the user interface of a slave communication device. As shown in FIG. 9, the display 610 of the master communication device 210 displays a window 910 showing the user interface of the slave communication device. The window 910 may include the whole of the display of the user interface of the slave communication device or may include part of the user interface. The window 910 includes icons 920 for actions on the slave communication device. These icons include an icon 930 to answer the incoming call and an icon 940 to reject the incoming call. In this embodiment, the icon 930 to answer the incoming call and the icon 940 to reject the incoming call form part of a virtual phone display region. The window 910 which forms part of the virtual phone display region also displays details of the incoming call, for example the number and name of the caller if these are available.

Returning to again FIG. 7, at step 710, a user interaction with the user interface (UI) of the slave communication device as displayed on the master communication device is received. The user interacts with the UI as displayed on the Master device to accept or reject a call. Once paired, all interaction with the master communication device and/or slave communication devices may take place through the master communication device. This means that a user does not have to directly interact with the slave devices which may remain, for example, inside a bag provided that they are coupled with the master communication device over the wireless network such as Bluetooth If in step 710, the user accepts the call, at step 712, the call is provided to the user on the master communications device via bi-directional audio over the wireless network.

Once the call is completed, at step 714, the call is terminated, either by the user selecting an end call icon or button on the UI of the slave communication device displayed on the master communication device, or by the other party on the call ending the call.

In addition to answering a telephone call, in embodiments of the present invention, a user may use the master communication device to control a slave communication device to perform other actions, such as to make a telephone call, to send a SMS or MMS message, to access an email account, to view and edit contact and calendar information stored on the slave device. In addition to notifications of incoming telephone calls, the pair slave communication devices may also indicate to a user of the master communication device other alerts, such as incoming SMS or MMS messages, in coming email messages, and alarms or reminder notifications from a calendar stored on the slave communication device. A user interacting with the master device may be able to access all applications running on the slave device. These may include messaging applications such as WhatsApp, mapping applications, viewers for files such as PDF viewers, and email applications.

While the slave communication device is coupled to the master communication device, the slave communication device may continue to operate independently, for example, notifications and alerts may be displayed by the slave communication device while it is coupled to the master communication device. The slave communication device may carry an indication that it is paired with the master communication device and may have a local control icon to disconnect from the master communication device at any time, and allow direct control. In such an embodiment, the slave communication device may continue to function independently while paired to communication device.

In an embodiment, the master communication device and the slave communication devices each have an application running on them. In the following, these are referred to as the master application and the slave application respectively.

Once paired, the master communication device and the slave communication devices will establish a communication channel between them using a wireless network such as Bluetooth.

The master application on the master communication device displays an icon representing each of the paired slave communication devices. The slave application on each paired slave only provides for a button to 'Exit' and disconnect the pairing and let the slave communication device operate independently.

The master application continuously monitors the communication channel to see if there is indication of any activity on any of the paired slave communication devices, and the slave application continuously monitors the communication channel to see if there are any commands from the master device.

There are two situations for operation, first, an action initiated from the master communication device. An example of this is user wishing to make a call or view the contact list remotely on a particular slave communication device. Second, an action resulting from an activity on any of the slave communication devices. An example of this is getting a call or receiving a text/SMS message on a slave communication device.

Considering the first situation, when the user of the master communication device presses a 'slave device' icon, a coded command gets transmitted to the specific slave communication device over the communication channel established between the master communication device and that slave communication device. The slave communication device acknowledges the command, and the master communication device displays a set of icons corresponding to 'Calls', 'SMS/Text messaging', 'contacts', Calendar' etc. . . ., mimicking UI of the slave communication device on the master communication device. The user taps the specific icon on the display of the master communication device to activate the specific function. For example to call out, view logs, view contact, set calendar, or send a text message. This command is received by the slave communication device through the communication channel and interpreted by the slave application to provide the requisite data/action.

The second situation mentioned above occurs when a call/message is received on the slave communication device. The slave application sends out a coded message to the master communication device. The master application interprets this message and flashes the icon, or generates an alert corresponding to the slave communication device. The user taps on the icon on the display of the master communication device and this causes the master application to send a command to the slave communication device. In response to the command, the slave communication device uses the communication channel to send appropriate messages and information to the master application on the master communication device. The master application and the slave application interact to enable the user to fulfill the function.

Whilst the foregoing description has described exemplary embodiments, it will be understood by those skilled in the art that many variations of the embodiment can be made within the scope and spirit of the present invention.

The invention claimed is:

1. A computer implemented method of controlling a slave communication device from a master communication device, said method comprising:
    displaying, on a display of the master communication device, an indication of a plurality of slave communication devices paired with the master communication device on a wireless network, wherein each of the plurality of slave communication devices is configured to electronically generate a user interface, wherein each electronically generated user interface is configured to be displayed on a display of the respective slave communication device, and wherein each electronically generated user interface comprises user controls for controlling each of the plurality of slave communication devices, the user controls comprising icons displayed for each of a voice call function of each of the plurality of slave communication devices, an access email function of each of the plurality of slave communication devices, a view and edit contact function of each of the plurality of slave communication devices, and a view and edit calendar function of each of the plurality of slave communication devices;
    receiving, on the master communication device, a user selection of a slave communication device from the plurality of slave communication devices;
    displaying, on a virtual phone display region of the display of the master communication device, the electronically generated user interface of the selected slave communication device, the electronically generated user interface of the selected slave communication device comprising the user controls of the selected slave communication device, thereby the virtual phone display region of the display of the master communication device and the display of the selected slave communication device display the electronically generated user interface of the selected slave communication device;
    receiving a user interaction with the user controls of the selected slave communication device via the display of the master communication device;
    transmitting control signals on a wireless network connection to cause the selected slave communication device establish a voice call in response to the user interaction; and
    transmitting and receiving bi-directional audio signals to and from the selected slave communication device over the wireless network connection to facilitate the voice call.

2. A method according to claim 1, further comprising:
    receiving an alert from a slave communication device; and
    providing a user alert indicating the corresponding slave communication device.

3. A method according to claim 2, wherein the alert is an alert of an incoming call.

4. A method according to claim 1 wherein the user interaction with the user controls of the selected slave communication device via the display of the master communication device is an indication to answer an incoming call.

5. A method according to claim 1 wherein the user interaction with the user controls of the selected slave communication device via the display of the master communication device is an indication to make an outgoing call.

6. A non-transitory computer readable medium having stored thereon program instructions for causing at least one processor to perform the method according to claim 1.

7. A communication device comprising a processor, a data storage device, and a wireless network interface, the data storage device having computer program modules comprising non-transitory instructions that cause the processor to:
    display, on a display of the communication device, an indication of a plurality of slave communication devices paired with the communication device, wherein each of the plurality of slave communication devices is configured to electronically generate a user interface, wherein each electronically generated user interface is configured to be displayed on a display of the respective slave communication device, and wherein each electronically generated user interface comprises user controls for controlling each of the plurality of slave communication devices, the user controls comprising icons displayed for each of a voice call function of each of the plurality of slave communication devices, an access email function of each of the plurality of slave communication devices, a view and edit contact function of each of the plurality of slave communication devices, and a view and edit calendar function of each of the plurality of slave communication devices;
    receive, on the communication device, a user selection of a slave communication device from the plurality of slave communication devices;
    display, on a virtual phone display region of the display of the communication device, the electronically generated user interface of the selected slave communication device, the electronically generated user interface of the selected slave communication device includes the user controls of the selected slave communication device, thereby the virtual phone display region of the display of the master communication device and the display of the selected slave communication device display the electronically generated user interface of the selected slave communication device;
    receive a user interaction with the user controls of the selected slave communication device via the display of the communication device;
    transmit control signals using a wireless network interface to cause the selected slave communication device to establish a voice call in response to the user interaction; and
    transmit and receive bi-directional audio signals to and from the selected slave communication device using the wireless network interface to facilitate the voice call.

8. A communication device according to claim 7, the computer program modules further comprising non-transitory instructions that cause the processor to:
    receive an alert from a slave communication device; and
    provide a user alert indicating the corresponding slave communication device.

9. A communication device according to claim 8, wherein the alert is an alert of an incoming call.

10. A communication device according claim 7 wherein the user interaction with the user controls of the selected slave communication device via the display of the communication device is an indication to answer an incoming call.

11. A communication device according to claim 8, wherein the alert is an alert of an incoming message.

12. A communication device according to claim 7, the computer program modules further comprising non-transitory instructions that cause the processor to:

receive a message view user interaction with the user controls of the selected slave communication device via the display of the communication device, the message view interaction including an indication to view an incoming message;

transmit control signals using the wireless network interface to cause the selected slave communication device to open an incoming message and send data indicative of the content to the incoming message to the communication device in response to the message view user interaction; and display the incoming message on the display of the communication device.

13. A communication device according to claim 11 wherein the incoming message is at least one of an SMS message, an MMS message, and an instant messaging message.

14. A communication device according to claim 11 wherein the incoming message is an email message.

15. A communication device according to claim 7, the computer program modules further comprising non-transitory instructions that cause the processor to:

receive a message send user interaction with the user controls of the selected slave communication device via the display of the communication device, the message send interaction including an indication to send an outgoing message; and transmit control signals using the wireless network interface to cause the selected slave communication device to send the outgoing message.

16. A communication device according to claim 15 wherein the outgoing message is at least one of an SMS message, an MMS message, and an instant messaging message.

17. A communication device according to claim 15 wherein the outgoing message is an email message.

18. A communication device according to claim 7, the computer program modules further comprising non-transitory instructions that cause the processor to:

receive a data access user interaction with the user controls of the selected slave communication device via the display of the communication device, the data access user interaction comprising an indication to access data stored on the selected slave communication device;

transmit control signals using the wireless network interface to cause the selected slave communication device to access data stored on the selected slave communication device and send an indication of the data stored on the selected slave communication device to the communication device in response to the data access user interaction; and display an indication of the data stored on the selected slave communication device on the display of the communication device.

19. A communication device according to claim 18, the computer program modules further comprising non-transitory instructions that cause the processor to:

receive a data modification user interaction with the user controls of the selected slave communication device via the display of the communication device, the data modification user interaction including an indication to modify the data stored on the selected slave communication device; and transmit control signals using the wireless network interface to cause the selected slave communication device to modify the data stored on the selected slave communication device in response to the data modification user interaction.

20. A communication device according to claim 18, wherein the data stored on the selected slave communication device includes at least one of calendar information and contact information.

21. A method in a slave wireless communication device, said method comprising:

electronically generating a user interface configured to be displayed on a display of the slave wireless communication device, wherein the electronically generated user interface comprises user controls for controlling the slave wireless communication device, the user controls comprising icons displayed for each of a voice call function of the slave wireless communication device, an access email function of the slave wireless communication device, a view and edit contact function of the slave wireless communication device, and a view and edit calendar function of the slave wireless communication device;

monitoring a communication channel between the slave wireless communication device and a master communication device using a first wireless network interface;

receiving, from a user interaction with the user controls of the slave wireless communication device via a virtual phone display region of a display of the master communication device, control signals over the communication channel to access the user controls of the slave wireless communication device, wherein the virtual phone display region of the display of the master communication device and the display of the slave wireless communication device display the electronically generated user interface of the slave wireless communication device;

establishing a voice call over using a second wireless network interface in response to the voice call function being accessed via the control signals; and transmitting and receiving bi-directional audio signals to and from the master communication device using the first wireless network interface to provide the voice call to the master communication device.

22. A method according to claim 21, further comprising:
receiving an indication of an incoming voice call on the second wireless network interface; and
providing an alert of the incoming voice call to the master communication device over the first wireless network interface, wherein the control signals to establish a voice call are control signals to answer the incoming voice call.

23. A method according to claim 21, wherein the control signals to establish a voice call are control signals to make an outgoing voice call.

24. A method according to claim 21, wherein the second wireless network interface is a cellular telephone network.

25. A non-transitory computer readable medium having stored thereon program instructions for causing at least one processor to perform the method according to claim 21.

26. A slave wireless communication device comprising a processor, a data storage device, a first wireless network interface, and a second wireless network interface, the data storage device having computer program modules comprising non-transitory instructions that cause the processor to:

electronically generate a user interface configured to be displayed on a display of the slave wireless communication device, wherein the electronically generated user interface comprises user controls for controlling the slave wireless communication device, the user controls comprising icons displayed for each of a voice call function of the slave wireless communication device, an access email function of the slave wireless communication device, a view and edit contact function of the slave wireless communication device, and a view and edit calendar function of the slave wireless communication device;

monitor a communication channel between the slave wireless communication device and a master communication device over a first wireless network;

receive, from a user interaction with the user controls of the slave wireless communication device via a virtual phone display region of a display of the master communication device, control signals over the communication channel to access the user controls of the slave wireless communication device, wherein the virtual phone display region of the display of the master communication device and the display of the slave wireless communication device display the electronically generated user interface of the slave wireless communication device;

establish a voice call over a second wireless network in response to the voice call function being accessed via the control signals; and transmit and receive bi-directional audio signals to and from the master communication device over the first wireless network to provide the voice call to the master communication device.

27. A slave wireless communication device according to claim 26, the computer program modules further comprising non-transitory instructions that cause the processor to:
receive an indication of an incoming voice call on the second wireless network interface; and
provide an alert of the incoming voice call to the master communication device using the first wireless network interface, wherein the control signals to establish a voice call include control signals to answer the incoming voice call.

28. A slave wireless communication device according to claim 26, wherein the control signals to establish a voice call include control signals to make an outgoing voice call.

29. A slave wireless communication device according claim 26, wherein the second wireless network interface is a cellular telephone network interface.

30. A slave wireless communication device according claim 26, the computer program modules further comprising non-transitory instructions that cause the processor to:
receive an indication of an incoming message on the second wireless network interface;
provide an alert of the incoming message to the master communication device using the first wireless network interface;
receive control signals from the master communication device using the first wireless network interface; and
open the incoming message and send data indicative of the content incoming message to the master communication device using the first wireless network interface in response to the control signals.

31. A slave wireless communication device according to claim 30 wherein the incoming message is at least one of an SMS message, an MMS message, and an instant messaging message.

32. A slave wireless communication device according to claim 30 wherein the incoming message is an email message.

33. A slave wireless communication device according claim 26, the computer program modules further comprising non-transitory instructions that cause the processor to:
receive control signals indicating an outgoing message from the master communication device using the first wireless network interface; and
send an outgoing message using the second wireless network interface.

34. A slave wireless communication device according to claim 33 wherein the outgoing message is at least one of an SMS message, an MMS message, and an instant messaging message.

35. A slave wireless communication device according to claim 33 wherein the outgoing message is an email message.

36. A slave wireless communication device according to claim 26, further comprising storage for user data, the computer program modules further comprising non-transitory instructions that cause the processor to:
receive data access control signals from the master communication device using the first wireless network interface, the data access control signals indicating a data item of the user data;
access the data item in response to the data access control signals; and
transmit an indication of the data item to the master communication device using the first wireless network interface.

37. A slave wireless communication device according to claim 36, the computer program modules further comprising non-transitory instructions that cause the processor to:
receive data modification control signals from the master communication device using the first wireless network interface, the data modification control signals indicating a data item and modification to the data item; and
modify the data item indicated by the data modification control signals in accordance with the data modification.

38. A slave wireless communication device according to claim 36, wherein the user data includes at least one of calendar information and contact information.

* * * * *

UNITED STATES PATENT AND TRADEMARK OFFICE
CERTIFICATE OF CORRECTION

| | |
|---|---|
| PATENT NO. | : 10,462,838 B2 |
| APPLICATION NO. | : 15/239208 |
| DATED | : October 29, 2019 |
| INVENTOR(S) | : Ajit Madhukar Karnik |

It is certified that error appears in the above-identified patent and that said Letters Patent is hereby corrected as shown below:

In the Specification

Column 7, Line 24, delete "the intern& and" and insert therefor -- the internet and --.

Signed and Sealed this
Twentieth Day of July, 2021

Drew Hirshfeld
*Performing the Functions and Duties of the
Under Secretary of Commerce for Intellectual Property and
Director of the United States Patent and Trademark Office*